United States Patent [19]
Goto et al.

[11] Patent Number: 6,009,044
[45] Date of Patent: Dec. 28, 1999

[54] FISH SONAR

[75] Inventors: Shigefumi Goto; Yoshiyuki Asakura; Yoshinobu Okubo, all of Aichi-ken; Kenji Moriyama; Yoshikazu Maramatsu, both of Aich-ken, all of Japan

[73] Assignee: Honda Electronics Co., Ltd., Toyohashi, Japan

[21] Appl. No.: 09/238,675

[22] Filed: Jan. 26, 1999

[30] Foreign Application Priority Data

| Jan. 27, 1998 | [JP] | Japan | 10-029193 |
| Jan. 27, 1998 | [JP] | Japan | 10-029194 |
| Jan. 27, 1998 | [JP] | Japan | 10-029195 |
| Jan. 27, 1998 | [JP] | Japan | 10-029196 |

[51] Int. Cl.⁶ ................................................ G01S 15/96
[52] U.S. Cl. ........................................ 367/107; 367/111
[58] Field of Search .................................. 367/87, 88, 99, 367/107, 111, 113, 908, 910, 98

[56] References Cited

U.S. PATENT DOCUMENTS

| 3,742,438 | 6/1973 | Brede et al. ............................ 367/98 |
| 4,081,783 | 3/1978 | Honda .................................. 367/101 |
| 4,644,511 | 2/1987 | Asakura et al. ........................ 367/101 |
| 4,873,676 | 10/1989 | Bailey et al. .......................... 367/98 |

*Primary Examiner*—Ian J. Lobo
*Attorney, Agent, or Firm*—Burgess, Ryan & Wayne

[57] ABSTRACT

Two digital reflectional signals of different depth ranges are displayed on two divided pictures in a display, whereby the conditions of the water and the bottom in the lake or pond can be detected. Therefore, the fish sonar is suitable for fishing for black bass.

5 Claims, 5 Drawing Sheets

FISH SONAR

BACKGROUND OF THE INVENTION

The present invention relates to a fish sonar in which conditions underwater and the bottom of a lake or a pond are displayed by two pictures on a display for fishing for black bass.

Generally, in fishing for black bass as a sport, information of whether a region of the lake or pond has a soft or hard bottom is necessary because black bass inhabit the hard bottom portion. However, a fish sonar whether having one frequency or two frequencies mainly displays the conditions underwater in the lake or pond.

The reflectional strength of the ultrasonic waves is weak when ultrasonic waves are reflected by a soft bottom portion of a lake or pond. Therefore, it is difficult to receive the second and third reflectional waves of the ultrasonic waves from the soft bottom portions of the lake or pond. On the other hand, the reflectional strength of the ultrasonic waves is strong when the ultrasonic waves are reflected by a hard bottom portion of a lake or pond. Therefore, it is easy to receive the second and third reflectional waves of the ultrasonic waves from the hard bottom portions of the lake or pond.

However, even if it is desired that the second and third reflectional waves of the ultrasonic waves are received by the prior fish sonar providing two pictures using two frequencies and that the information on the condition of the bottom of the lake or pond is precisely obtained, when the depth range of this fish sonar is set to a deep condition, the picture between the position of the vibration in the water and the bottom in the lake or pond is compressed. It is difficult for the display of the fish sonar to display bottom conditions and fish underwater. Therefore, the bottom conditions and fish underwater in the lake or pond cannot be displayed by the prior fish sonar when the second and third reflectional waves of the ultrasonic waves are displayed by the fish sonar.

SUMMARY OF THE INVENTION

It is therefore the primary object of the present invention to provide a fish sonar in which conditions under the water and the condition of the bottom of the lake or pond are respectively displayed by two pictures on a display by using ultrasonic waves having one frequency.

It is another object of the present invention to provide a fish sonar in which, by using two ultrasonic waves of different frequencies, the conditions under the water in the lake or pond are displayed by one picture on a display by one ultrasonic wave frequency, and the condition of the bottom of the lake or pond is displayed by the other picture of the display by the other ultrasonic wave frequency.

In order to accomplish the above and other objects, the present invention comprises one oscillating means for inputting oscillating signals to an ultrasonic vibrator, first and second receiving means for receiving and amplifying reflectional signals generated by the ultrasonic vibrator, first and second depth setting means for setting a range of depth for the first and second receiving means, first and second analogue to digital converters for respectively converting the reflectional signals to digital reflectional signals, first and second memories for respectively memorizing the digital reflectional signals, a control means for reading out the digital reflectional signals from the first and second memories and a display means for respectively displaying the digital reflectional signals by two pictures differing in depth.

In a second embodiment, two ultrasonic vibrations emit vibrations into the water, the reflections of which are received by two different receivers. The depth of the reflected vibrations are independently set by two depth setting means and the signals reflected from the bottom (greater depth) are displayed on one of two display screens and the signals reflected from fish above the bottom are displayed on the second of two display screens. The device comprises a first oscillating means for inputting oscillating signals at a first frequency to a first ultrasonic vibrator, a second oscillating means for inputting oscillating signals having a second frequency different from the first frequency, a first receiving means for receiving and amplifying reflectional signals generated by the first ultrasonic vibrator, a second receiving means for receiving and amplifying reflectional signals generated by the second ultrasonic vibrator, first and second depth setting means for setting a range of depths in the first and the second receiving means, first and second analogous to digital converters for respectively converting the reflectional signals from the first and the second receiving means to digital reflectional signals, first and second memories for respectively memorizing the digital reflectional signals from the first and the second analogous to digital converters, and a display means for displaying two pictures formed by the digital reflectional signals of different depths.

DESCRIPTION OF THE PREFERRED EMBODIMENTS

Figure 1:
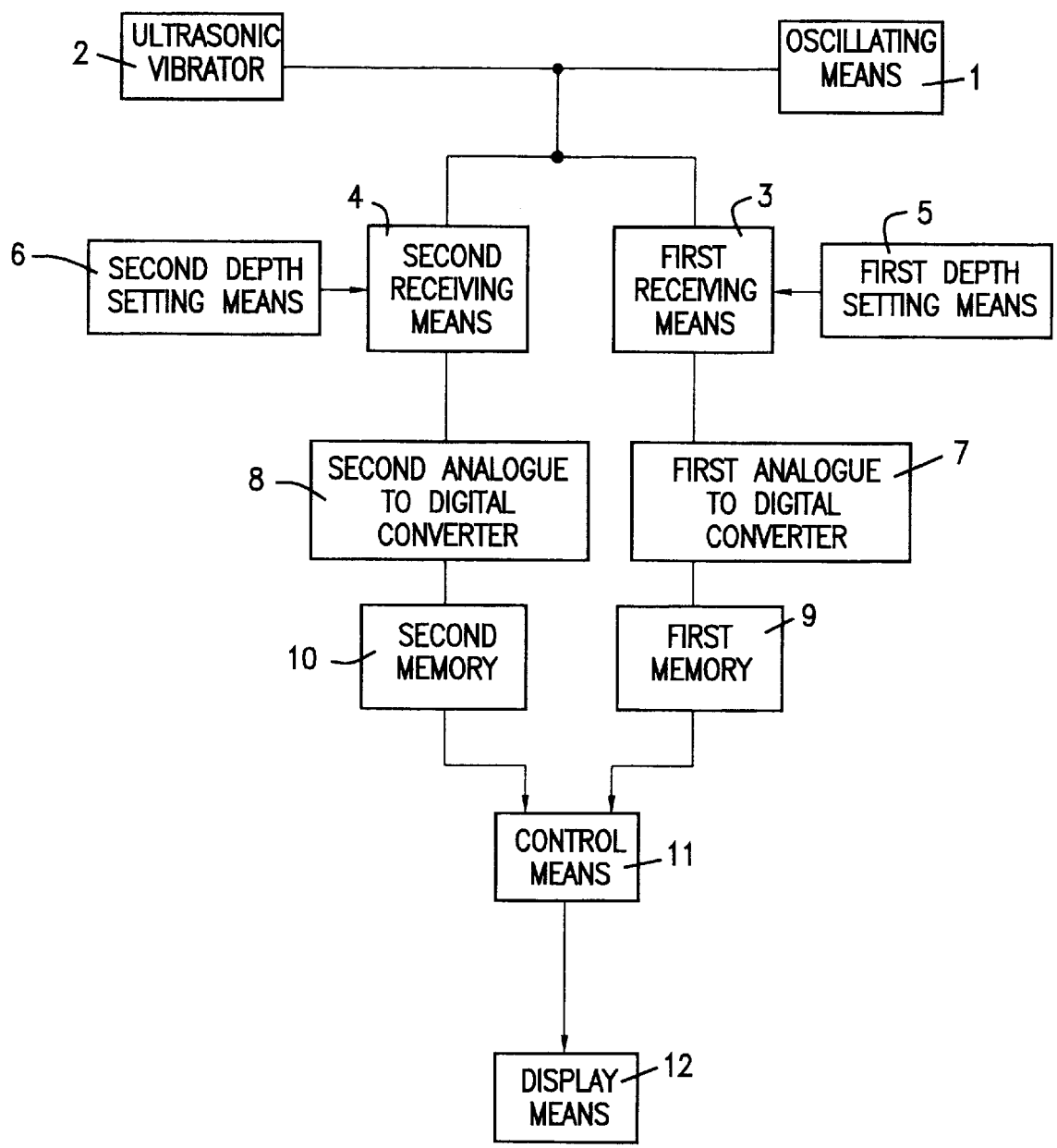
FIG. 1 shows a block diagram of a fish sonar in a first embodiment of the present invention.

Referring to FIG. 1, an output terminal of an oscillating means 1 is connected to an ultrasonic vibrator 2 and input terminals of first and second receiving means 3 and 4, first and second depth setting means 5 and 6 for respectively setting depth are connected to the first and second receiving means 3 and 4; output terminals of the first and second receiving means 3 and 4 are connected to input terminals of the first and second analogue to digital converters 7 and 8; output terminals of the first and second analogue and digital converters 7 and 8 are connected to input terminals of the first and second memories 9 and 10; the output terminals of the first and second memories 9 and 10 are connected to a control means 11, and a display means 12 is connected to the control means 11.

In the fish sonar of the present invention, when oscillating signals of one frequency are applied from the oscillating means 1 to the ultrasonic vibrator 2, the ultrasonic waves from the ultrasonic vibrator 2 are emitted under the water surface to the bottom of the lake or pond. The ultrasonic waves reflected by fish and other objects between the ultrasonic vibrator and the bottom and the ultrasonic wave reflected from under the bottom are received by the ultrasonic vibrator 2 and are converted to the reflectional signals by the ultrasonic vibrator 2. The reflectional signals from the ultrasonic vibrator 2 are applied to the first and second receiving means 3 and 4 and are amplified by receiving means 3 and 4.

Since the first and second depth setting means 5 and 6 are respectively connected to the first and second receiving means 3 and 4, the depth range of the first receiving means 3 is set by the first depth setting means 5 so that the reflectional signals between the surface of the water and the bottom of the lake or pond and the first reflectional signal reflected by the bottom are received by the first receiving means 3. The depth range of the second receiving means 4 is set by the second depth setting means 6 so that the second and third reflectional signals reflected by the portion below the bottom are received by the second receiving means 4 and the sensitivity setting means are respectively set by the first and second depth setting means 5 and 6.

The reflectional signals received and amplified by the first and second receiving means 3 and 4 are converted to digital reflectional signals by the analogue to digital converters 7 and 8 and are respectively memorized by the first and second memories 9 and 10.

Figure 2:
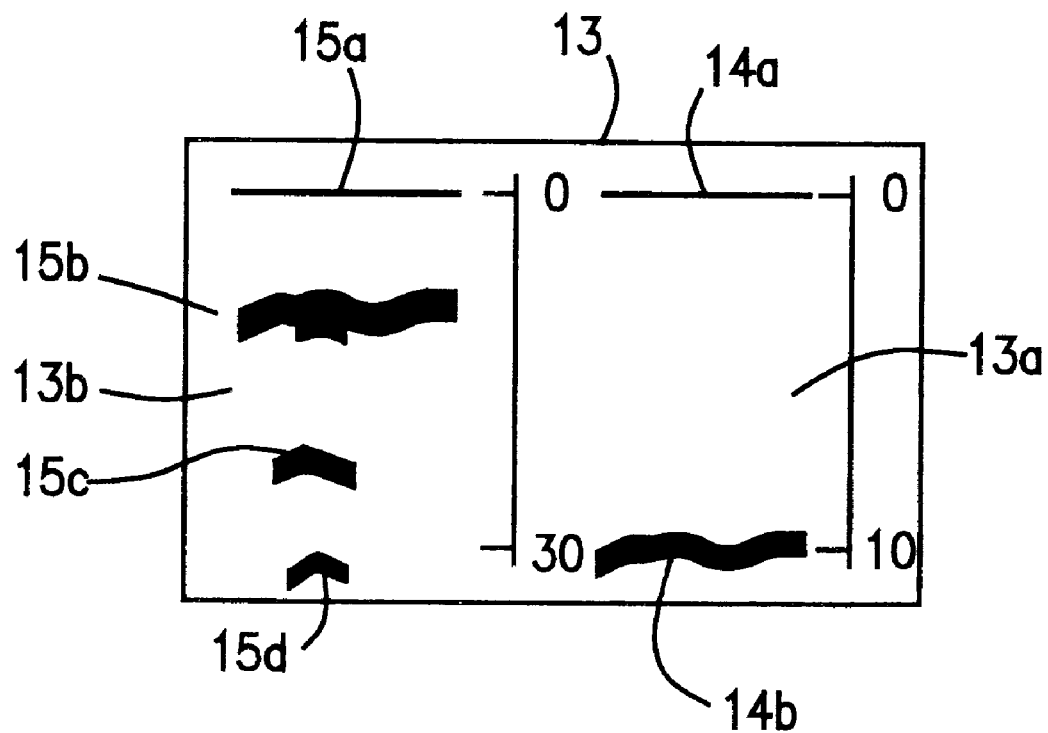
FIG. 2 shows two pictures displayed on a display means.

The digital reflectional signals memorized by the first and second memories 9 and 10 are respectively read out in order by the control means of a central processing unit and as shown in FIG. 2, the condition under the water between the ultrasonic vibrator in the water 14a and the bottom 14b which is set by the first depth setting means 5, is displayed on the divided picture 13a in the picture 13 of the display means 12.

The surface 15a of the water, the bottom 15d due to the first reflectional wave, the bottom 15c due to the second reflectional wave and the bottom 15d due to the third reflectional wave are displayed on the divided picture 13b. Therefore, a place which displays the bottom 15c and the bottom 15d is a hard bottom of the lake or pond and a place where the third reflectional wave is not displayed, only the first reflectional wave is displayed and the second and third reflectional waves are not displayed is a soft bottom of the lake or pond.

In the present invention, the oscillating signal is transmitted from the oscillating means 1 to the one ultrasonic vibrator 2, the reflectional signals from under the water and the bottom of the lake or pond are respectively received by the ultrasonic vibrator 2 and amplified by the first and second receiving means 3 and 4 in which the different depth ranges are set by the first and second depth setting means 5 and 6. The reflectional signals are respectively displayed by the divided pictures 13a and 13b on the picture 13 of the display 12. Therefore, the condition under the water in the usual picture can be seen in the divided picture 13a and the hard and soft condition of the bottom can be seen from the second and third reflectional signals on the divided picture 13b.

Figure 3:
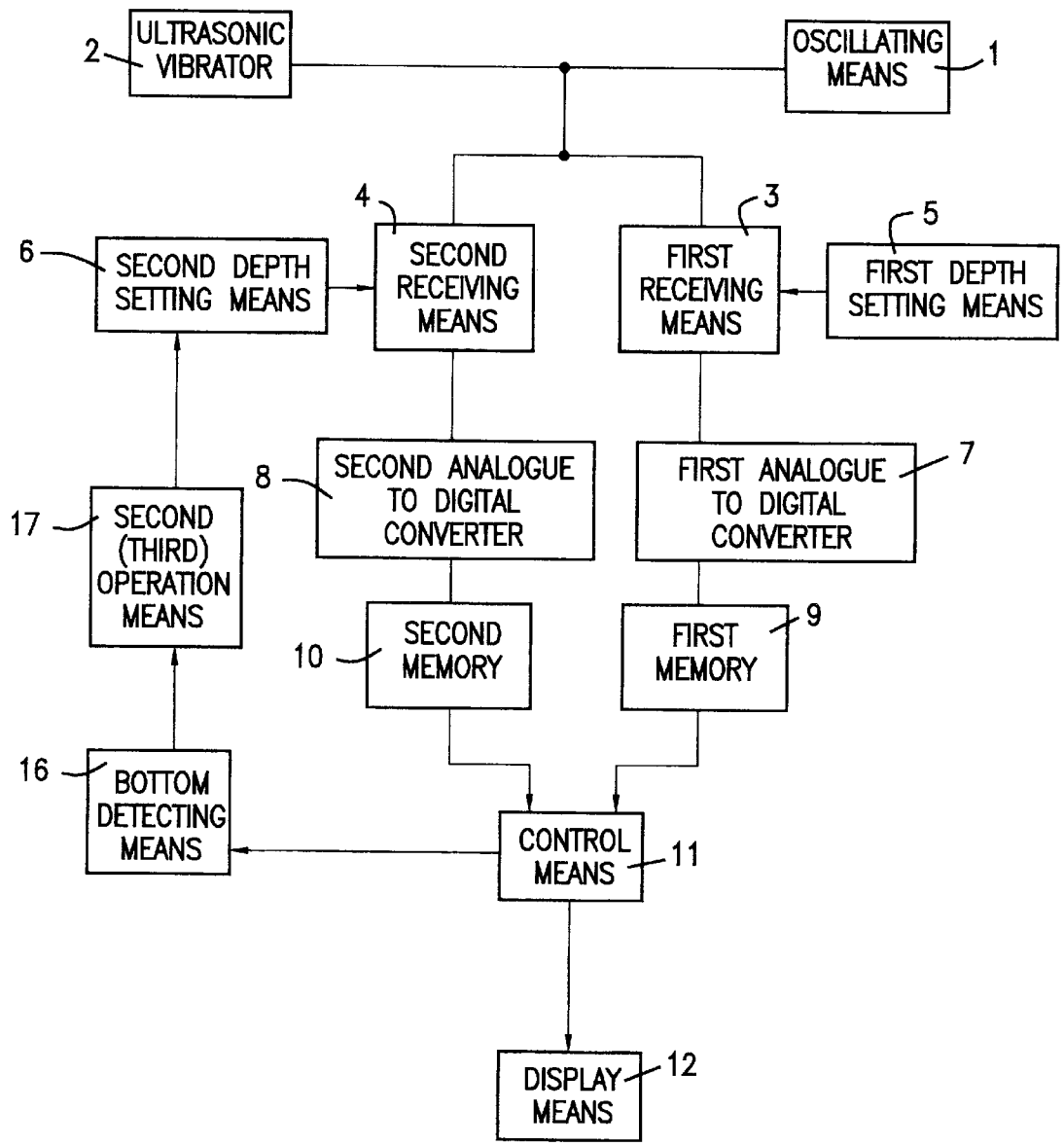
FIG. 3 shows a block diagram of a fish sonar in a second embodiment of the present invention.

Referring to FIG. 3, 1 designates an oscillating means; 2 an ultrasonic vibrator; 3 a first receiving means; 4 a second receiving means; 5 a first depth setting means; 6 a second depth setting means; 7 a first analogue to digital converter; 8 a second analogue to digital converter; 9 a first memory; 10 a second memory; 11 a control means, and 12 a display means. Since these components are the same as that in the above embodiment, the explanation of these components and their interconnection is omitted.

In the embodiment of FIG. 3, a bottom detecting means 16 is connected to the control means 11 and detects the bottom digital reflectional signal from the digital reflectional signals read out by each of the first and second memories 9 and 10. A second (third) signal detecting means 17 for detecting multiple signals of the second (third) reflected signals in the digital reflectional signals from each of the first and second memories 9 and 10 is connected to the bottom detecting means 16, and the multiple signals detected by the second (third) detecting means 17 are input to the second setting means 6 and the region of the depth received by the second receiving means 5 is automatically set.

In the present embodiment, the signals having one frequency from the oscillating means 1 is supplied to the ultrasonic vibrator 2, reflectional signals from under the water and the bottom are received by the ultrasonic vibrator 2 and amplified by the first and second receiving means 3 and 4.

Then, since the first depth setting means 5 is previously set to a usual depth of the water, the reflectional signals between the position of the ultrasonic vibrator in the water and the bottom are amplified by the first receiving means 3, and the reflectional signals received and amplified by the first receiving means 3 are converted by the first analogue to digital converter 7 to digital reflectional signals and are memorized by the first memory 9.

When the digital reflectional signals memorized by the first memory 9 are read out by the control means, the bottom digital signals are detected in the digital reflectional signals by the bottom detecting means 16. The multiple signals for the second (third) reflectional signals are detected by the second reflectional signal detecting means 17 from the bottom digital signals supplied from the bottom detecting means 16 to the second (third) detecting means 17. When the multiple signals are supplied to the second depth setting means 6, the second depth setting means 6 automatically sets the depth range for receiving the second and third reflectional signals following the bottom reflectional signal from the reflectional signals received by the ultrasonic vibrator 2. The reflectional signals received and amplified by the second receiving means 4 are converted to digital reflectional signals by the second analogue to digital converter 9, and the digital reflectional signals are memorized by the second memory 10.

Then, the digital reflectional signals respectively and successively read out from the first and second memories 9 and 10 by the control means 11 are displayed by the picture 13 of the display means 12 as two divided pictures 13a and 13b as shown in FIG. 2; the divided picture 13a displays the condition between the surface 14a of the water and the bottom 14b of the lake or pond as set by the depth setting means 15, the divided picture 13b displays the surface 15a, the first reflectional signal 15b of the bottom, the second reflectional signal 15c of the bottom, and the third reflectional signal 15d of the bottom. Therefore, the bottom which produces the second and third reflectional signals 15c and 15d is hard and the bottom which does not produce the second and third reflectional signals 15c and 15d is soft.

In the above embodiment, the depth range between the surface of the water and the bottom is set by the first setting means 5, and the bottom digital reflectional signals are detected from the digital reflectional signals memorized by the first memory 9 by the bottom detecting means 16. On the other hand, at the depth range set by the second setting means 6, the reflectional signals received by the second receiving means 4 and are converted to the digital reflectional signals by the second analogue to digital converter 8, and the digital reflectional signals are memorized by the second memory 10. Then, the digital reflectional signals are read out from the second memory 10 by the control means 11 and are supplied to the bottom detecting means 16. The bottom digital signal is detected from the digital reflectional signals by the bottom detecting means 16, the multiple signals for detecting the second (third) reflectional signals are detected by the second (third) reflectional signal detecting means 17 from the input of the bottom digital signal, and the second setting means 6 automatically sets the depth range for detecting the second (third) reflectional signals by inputting the multiple signal to the second depth setting means 6. The second (third) reflectional signals are detected by the second receiving means 4 and are converted to digital reflectional signals by the analogue to digital converter 9, the digital reflectional signals are memorized by the second memory 10, the usual digital reflectional signals of the conditions underwater are read out by the first memory 9, and the second (third) digital reflectional signals of the condition in the bottom are read out by the second memory 10.

Figure 4:
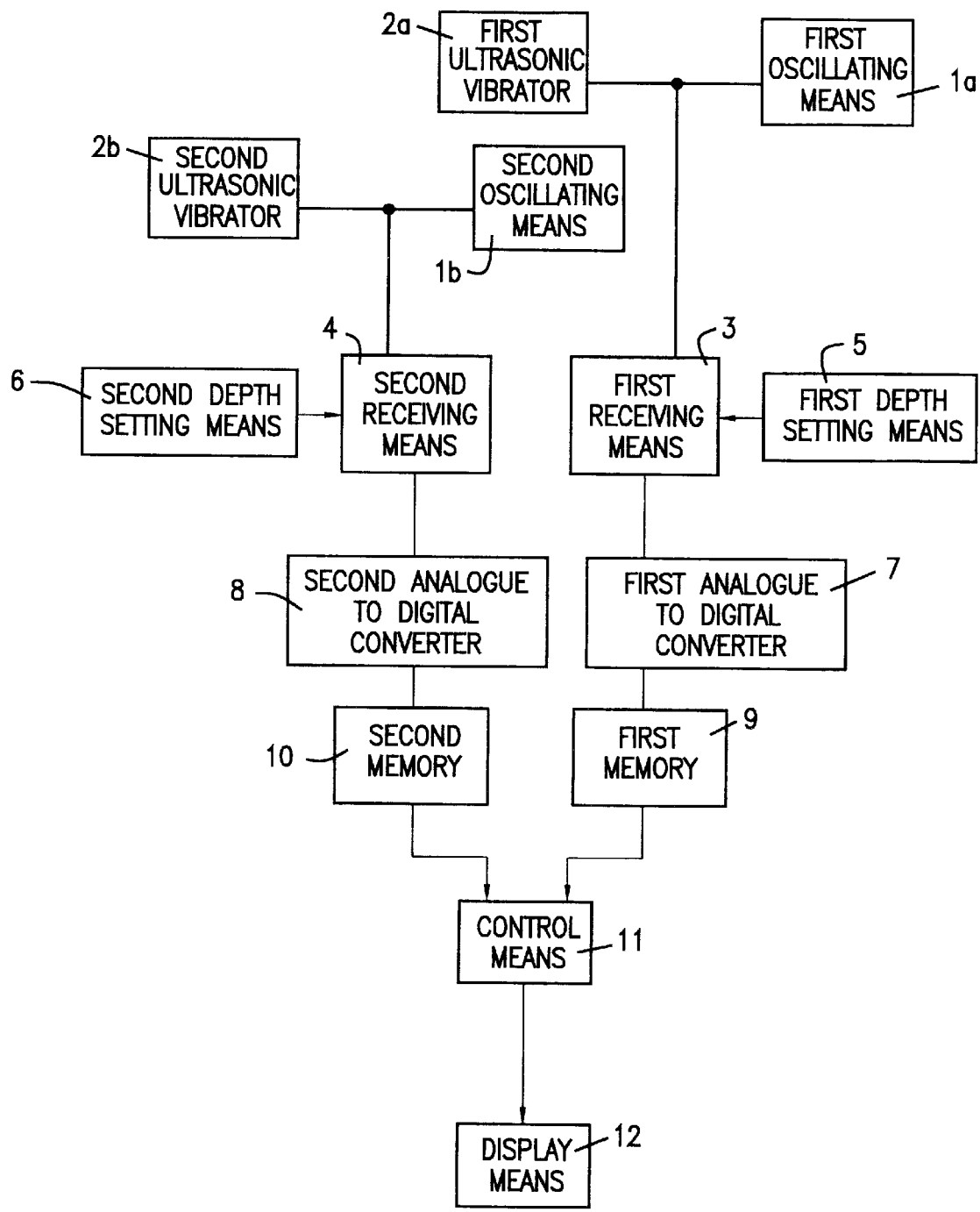
FIG. 4 shows a block diagram of a fish sonar in a third embodiment of the present invention.

Referring to FIG. 4, 1a, designates a first oscillating means; 2a, a first ultrasonic vibrator, 1b, a second oscillating means; 2b a second ultrasonic vibrator, 3, a first receiving means; 4, a second receiving means; 5, a first depth setting means; 6, a second depth setting means; 7, a first analogue to digital converter; 8, a second analogue to digital converter, 9, a first memory; 10, a second memory; 11, a control means, and 12, a display means. Since these components are the same as that in the above embodiments, the explanation of these components and their connection is omitted. A first ultrasonic vibrator 2a is connected to a first oscillating means 1a for generating a first signal detected by the first receiving means 3 and a second ultrasonic vibrator 2b is connected to a second oscillating means 1b for generating a second signal detected by the second receiving means 4. The signals generated by the first and second oscillating means are of different frequencies and preferably the second signal is of a frequency lower than a frequency of the first signal.

In the present embodiment, when the signals of the first frequency from the first oscillating means 1a are applied to the first ultrasonic vibrator 2a and the signals of the second frequency from the second oscillating means 1b are applied to the second ultrasonic vibrator 2b, the two different frequency signals are emitted under water by the first and second ultrasonic vibrators 2a and 2b; the reflectional signals of the water and the bottom are respectively received by first and second receiving means 3 and 4.

Because the first and second depth setting means 5 and 6 are respectively connected to the first and second receiving means 3 and 4, the depth range in the first receiving means 3 is set by the depth setting means 5 to input the first signal reflectional signals between the surface of the water and the bottom, and the depth of the second receiving means 4 is set by the depth setting means 6 to input the second signal reflectional signals of the bottom and the second and third reflectional signals.

The first and second frequency reflectional signals respectively received and amplified by the first and second receiving means 3 and 4 are respectively converted to first and second frequency digital reflectional signals by the first and second analogue to digital converters 7 and 8 and the first and second frequency digital reflectional signals are respectively memorized by the first and second memories 9 and 10.

The first and second frequency digital reflectional signals respectively memorized by the first and second memories 9 and 10 are read out in order by the control means 11. Then, as shown in FIG. 2, the first frequency digital reflectional signals are displayed on the divided picture 13a of the picture 13 in the display means 12 as the condition of the water between the surface 14a of the water and the bottom 14b as set by the first setting means 5. The second frequency digital reflectional signals are displayed on the divided picture 13b of the picture 13 in the display means 12 as the condition of the surface 15a of the water, the bottom 15b, the bottom 15c due to the second digital reflectional signal, the bottom 15d due to the third digital reflectional signal, as set by the second setting means 6. Accordingly, the place where the bottom digital signals 15c and 15d are detected is hard and the place where only the bottom digital signal 15b is detected and no bottom digital signal 15c is detected is soft.

As stated above, the condition of the water can be seen in the usual picture of the divided picture 13a due to the preferably first high frequency signals having a narrow directional angle, and the condition of the bottom can be seen by the divided picture 13b due to the second and third reflectional signals of preferably second low frequency signals having a wide directional angle and little attenuation. Therefore, by using the first high and second low frequency signals, the resolving power of the fish sonar of the present invention is improved, and the condition of the bottom is very clearly displayed on the divided picture 13b and the hard and soft places of the bottom are clearly distinguished.

In the above embodiment, even though the condition of water is detected by the high frequency signals and the second and third reflectional signals are detected by the low frequency signals, the condition of the water may be detected by the low frequency signals and the second and third reflectional signals detected by the high frequency signals.

Figure 5:
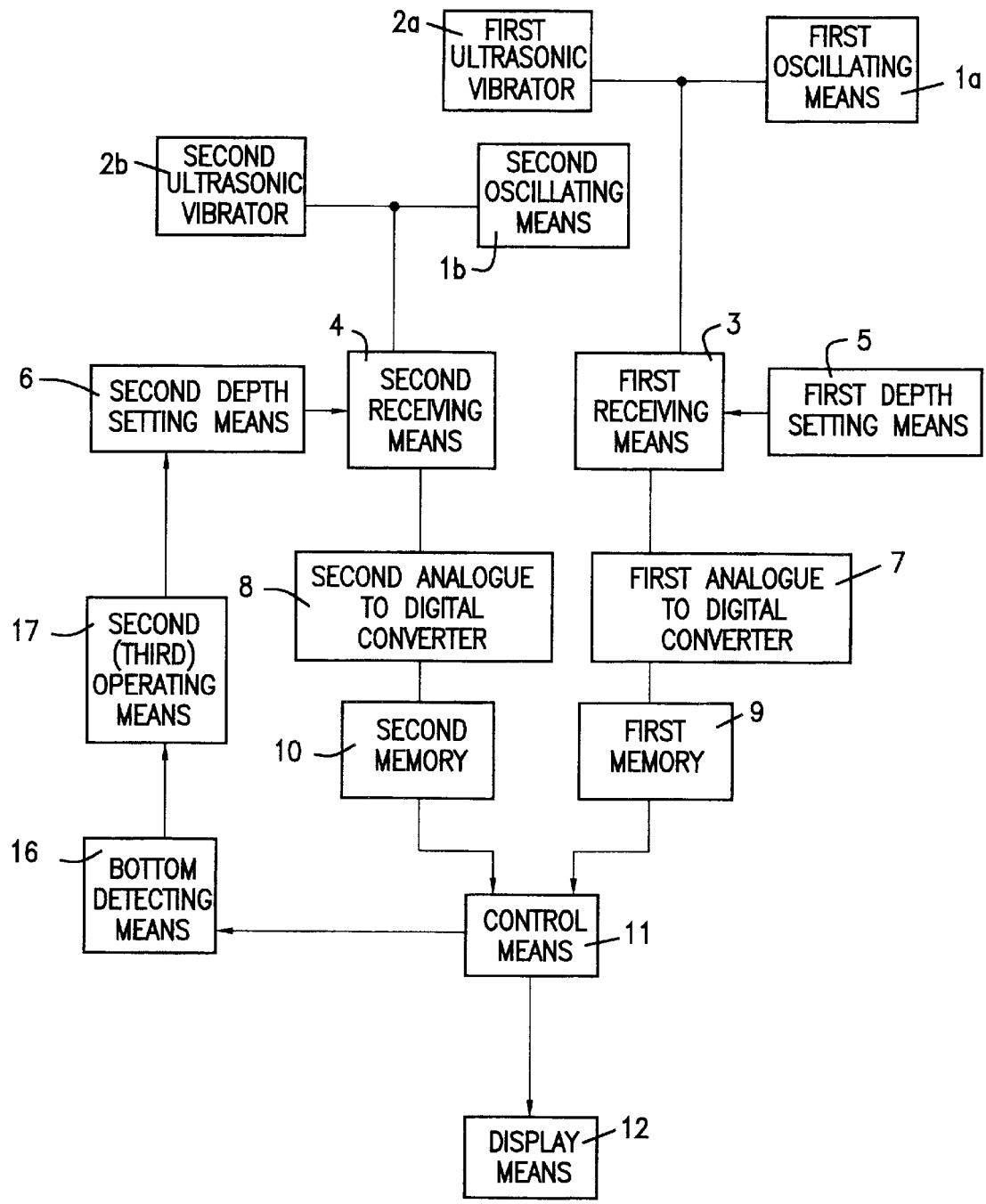
FIG. 5 shows a block diagram of a fish sonar in a forth embodiment of the present invention.

Referring to FIG. 5, 1a designates a first oscillating means; 1b, a second oscillating means; 2a, a first ultrasonic vibrator; 2b, a second ultrasonic vibrator; 3, a first receiving means; 4, a second receiving means; 5, a first depth setting means; 6, a second depth setting means; 7, a first analogue to digital converter; 8, a second analogue to digital converter; 9, a first memory; 10, a second memory; 11, a control means; 12, a display means; 16, a bottom detecting means and 17, a second (third) reflectional signal detecting means. Since these components are the same as that in the above embodiment, the explanation of these components and their connection is omitted.

In the present embodiment, as shown in FIG. 3, the depth range of the second depth setting means 6 is automatically set by the bottom detecting means 16 and the second (third) detecting means 17 and as shown in FIG. 4, by using high and low frequencies signals from the first and second oscillating means 1a and 1b, the resolving power of the fish sonar of the present invention is improved, and the condition of the bottom is very clearly displayed on the divided picture 13b and the hard and soft places of the bottom are clearly distinguished.

What is claimed is:

1. A fish sonar comprising one oscillating means for inputting oscillating signals to an ultrasonic vibrator, first and second receiving means for receiving and amplifying reflectional signals generated by the ultrasonic vibrator, first and second depth setting means for setting a range of depth for each of the first and second receiving means, first and second analogue to digital converters for respectively converting the reflectional signals from the first and the second receiving means to first and second digital reflectional signals, first and second memories for respectively memorizing the digital reflectional signals from the first and second analogue to digital converters, a control means for reading the first and second digital reflection signals and a display means for respectively displaying the digital reflectional signals by two pictures of different depths and also including a bottom detecting means to detect the bottom digital reflectional signals from the digital reflectional signals memorized by each of said first and second memories, multiple signals for detecting said second reflectional signals which are detected from the bottom digital reflectional signals by said second detecting means which are applied to said second depth setting means.

2. A fish sonar as set forth in claim 1 wherein the first and second depth setting means respectively comprise sensitivity setting means.

3. A fish sonar comprising a first oscillating means for inputting oscillating signals having a first frequency to a first ultrasonic vibrator, a second oscillating means for inputting oscillating signals having a second frequency to a second ultrasonic vibrator, a first receiving means for receiving and amplifying reflectional signals generated by the first ultrasonic vibrator, a second receiving means for receiving and amplifying reflectional signals generated by the second ultrasonic vibrator, first and second depth setting means for setting a range of depth in each of the first and second receiving means, first and second analogue to digital converters for respectively converting the reflectional signals from the first and second receiving means to digital reflectional signals, first and second memories for respectively memorizing the digital reflectional signals from the first and second analogue to digital converters, a control means for reading out the first and second digital reflectional signals and a display means for respectively displaying the digital reflectional signals by two pictures of different depths and also including a bottom detecting means to detect the bottom digital reflectional signals from said digital reflectional signals memorized by each of the first and second memories, multiple signals for detecting the second reflectional signals detected in the bottom digital reflectional signal by a second detecting means which are applied to the second depth setting means.

4. A fish sonar as set forth in claim 3 wherein the first and second depth setting means respectively have sensitivity setting means.

5. The first sonar as set forth in claim 3 wherein the first frequency is higher than the second frequency.

* * * * *